(12) United States Patent
Dubkov et al.

(10) Patent No.: US 7,385,011 B2
(45) Date of Patent: Jun. 10, 2008

(54) METHOD FOR INTRODUCING CARBONYL GROUPS INTO POLYMERS CONTAINING DOUBLE CARBON-CARBON LINKAGES

(75) Inventors: Constantin Alexandrovich Dubkov, Novosibirsk (RU); Sergey Vladimirovich Semikolenov, Novosibirsk (RU); Vladimir Alexandrovich Zakharov, Novosibirsk (RU); Valentin Nikolaevich Parmon, Novosibirsk (RU); Ludmila Gennadyevna Echevskaya, Novosibirsk (RU); Evgeny Vladimirovich Starokon, Bersk (RU); Gennady Ivanovich Panov, Novosibirsk (RU)

(73) Assignee: Institut Kataliza Imeni G.K. Boreskova, Sibirskogo Otdeleniya Rossiiskoi Akademii Nauk, Novosibirsk (RU)

( * ) Notice: Subject to any disclaimer, the term of this patent is extended or adjusted under 35 U.S.C. 154(b) by 297 days.

(21) Appl. No.: 10/558,224

(22) PCT Filed: May 17, 2004

(86) PCT No.: PCT/RU2004/000186

§ 371 (c)(1),
(2), (4) Date: Nov. 23, 2005

(87) PCT Pub. No.: WO2004/104053

PCT Pub. Date: Dec. 2, 2004

(65) Prior Publication Data

US 2006/0293465 A1    Dec. 28, 2006

(30) Foreign Application Priority Data

May 23, 2003   (RU)  ............................... 2003115338
May 23, 2003   (RU)  ............................... 2003115339

(51) Int. Cl.
C08F 8/06    (2006.01)
C08C 19/04   (2006.01)

(52) U.S. Cl. ................. 525/374; 525/377; 525/383
(58) Field of Classification Search ........... 525/374, 525/377, 383
See application file for complete search history.

(56) References Cited

U.S. PATENT DOCUMENTS

| | | | |
|---|---|---|---|
| 3,530,109 A | 9/1970 | Fenton | |
| 3,607,536 A | 9/1971 | Bragole | |
| 4,076,911 A | 2/1978 | Fenton | |
| 4,567,241 A | 1/1986 | Kitchens | |
| 4,613,653 A | 9/1986 | Kitchens | |
| 5,216,120 A | 6/1993 | Drent et al. | |
| 5,229,172 A | 7/1993 | Cahalan et al. | |
| 5,310,871 A | 5/1994 | Sommazzi et al. | |

FOREIGN PATENT DOCUMENTS

| | | | |
|---|---|---|---|
| DE | 195 05 354 A1 | | 8/1996 |
| DE | 100 55 646 A1 | | 5/2002 |
| EP | 0 802 213 A2 | | 10/1997 |
| GB | 649680 | * | 9/1949 |
| GB | 649680 A | | 1/1951 |
| RU | 2190625 C1 | | 10/2002 |
| SU | 1238132 | | 6/1986 |
| WO | 96/03367 | | 2/1996 |

OTHER PUBLICATIONS

Fifth Symposium on Combustion; Combustion in Engines and Combustion Kinetics; Reinhold Publishing Corp., New York, Chapman & Hall, LTD., London, 1955, pp. 620-628.
Nitrous Oxide ($N_2O$)—Waste to Value; Studies in Surface Science and Catalysis 130; A. Corma, F.V. Melo, S. Mendioroz and J.L.G. Fierro (Editors); 2000 Elsevier Science B.V.; pp. 743-748.

* cited by examiner

*Primary Examiner*—Ling-Siu Choi
(74) *Attorney, Agent, or Firm*—Ladas and Parry LLP

(57) ABSTRACT

The invention discloses a method for selectively introducing carbonyl groups into polymers by oxygenation of double C=C bonds of polymers with the aid of nitrous oxide ($N_2O$) at a temperature comprised between 50 and 350° C. and a pressure of $N_2O$ of from 0.01 to 100 atmospheres.

The introduction of an insignificant amount of C=O groups allows one to modify the physico-chemical properties of a polymer, with its molecular weight and molecular-weight distribution preserved. Deeper oxygenation results in controlled cleavage of polymer macromolecules and makes it possible to produce oxygen-containing oligomers having a desired molecular weight.

6 Claims, 4 Drawing Sheets

METHOD FOR INTRODUCING CARBONYL GROUPS INTO POLYMERS CONTAINING DOUBLE CARBON-CARBON LINKAGES

FIELD OF THE INVENTION

The invention relates to a method for introducing carbonyl groups into polymers containing double carbon-carbon bonds.

Natural and synthetic polymers form a basis for the manufacture of various plastics, elastomers, vulcanized rubbers, paint and varnish materials, artificial fibers, to mention only few. However, many of them have weak hydrophilic, adhesive and antistatic properties.

BACKGROUND OF THE INVENTION

The known method of changing the properties of polymers is chemical modification thereof by introducing polar functional groups at a stage of polymerization using modifying monomers. One of the examples illustrating this modification is copolymerization of butadiene with methacrylic acid resulting in the obtaining of carboxylate rubbers. In patents (U.S. Pat. No. 3,530,109, 22 Sep. 1970, CO8F 1/67, 13/04. D.M.Fenton, et al.; U.S. Pat. No. 3,689,460, 09 May. 09, 1972, CO8F 1/67, 13/04, K.Nzaki; U.S. Pat. No. 4,076,911, 28 Feb. 1978, CO8F 004/26, D. M. Fenton; U.S. Pat. No. 5,310,871, 05 May 1994, CO8G 067/02, A. Sommazzi, et al.; U.S. Pat. No. 5,216,120, 06 Jan. 1993, CO8G 067/02, E.Drent, et al.; EP Pat. No. 0,802,213, 22 Oct. 1997, CO8G 067/02, A. Sommazzi, et al.) a disclosure is made of methods for introducing carbonyl groups into polymers through CO copolymerization with olefinic and diene monomers in the presence of complexes of palladium resulting in the obtaining of alternating polymers.

Another method for the modification of polymers is introduction of diverse polar functional groups into polymers already produced. This method finds a particularly wide variety of application with respect to polymers containing double carbon-carbon bonds (C=C). These both can be residual double bonds (for example in polyolefins) and regular double bonds (for example in polydienes).

For example, in patents (U.S. Pat. No. 4,613,653, 23 Sep. 1986, CO8F 008/00, J. D. Kitchens, et al.; U.S. Pat. No. 4,567,241, 28 Jan. 1986, CO8F 008/32, J. D. Kitchens, et al.; U.S. Pat. No. 3,607,536, 21 Sep. 1971, B44D 1/50, CO8F 27/10, R. A. Bragole) a disclosure is made of methods for the modification of polymers by introducing thiocyanate or isothiocyanate groups on C=C bonds using chemical methods or by exposure to a UV-radiation.

In patent (U.S. Pat. No. 5,229,172, 20 Jul. 1993, BO5D 003/06, P. T., Cahalan, et al.) there is shown and described a method for modifying polyolefins by grafting an acrylamide monomer by exposure to a UV-radiation in the presence of cerium ions.

SUMMARY OF THE INVENTION

The present invention describes a new method for introducing carbonyl groups into polymers containing double carbon-carbon bonds. According to this method, process is carried out by selectively oxygenating double C=C bonds of primary (parent) polymers into aldehyde and ketone groups with the aid of nitrous oxide:

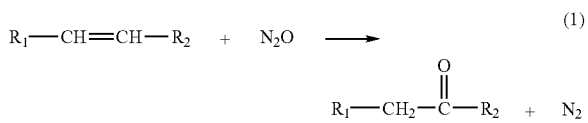

wherein $R_1$—hydrocarbon radical, $R_2$—hydrocarbon radical or hydrogen atom. And subjected to oxygenation are both terminal and internal double C=C bonds of the primary (parent) polymers.

The claimed process can be conducted without solvents. However, it is more preferable to carry out the process with the use of solvents which can be selected from a wide circle of substances utilized in the organic synthesis practice.

DETAILED DESCRIPTION OF THE INVENTION

Figure 1:
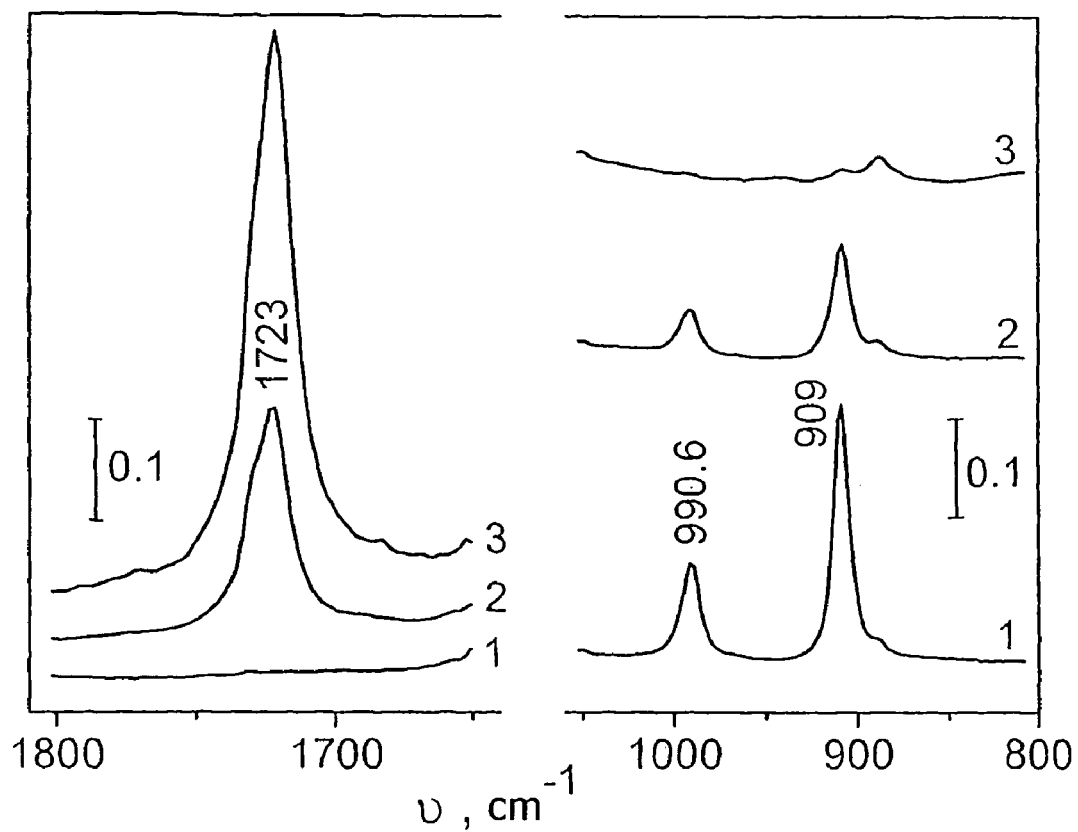
FIG. 1 shows the IR-spectra of primary polyethylene before and after treatment with nitrous oxide.

It is known that nitrous oxide is capable of forming inflammable mixtures with organic compounds (G. Panetier, A. Sicard, V Symposium on Combustion, 1955, p. 620). According to the present invention, for blast-resistance of a process to be increased, a reaction mixture can be added as dilution gas an inert gas which does not react with $N_2O$, for example nitrogen, argon, helium, carbon dioxide, to mention only few, or a mixture thereof The role of the dilution gas can be played by reaction waste gases. For explosion hazard to be diminished, the reaction mixture can also be added with combustion inhibitors such as trifluorobromo-methane, difluorochlorobromo-methane, dibromotetradluoro-ethane and so on, and so forth.

The claimed method for introducing carbonyl groups into polymers does not call for a high purity of nitrous oxide which can be utilized both in pure form and with admixtures of different gases whose presence can be associated with a method for producing same. For example, a nitrous oxide source employed can be represented by waste gases in the production of adipic acid wherein the $N_2O$ content attains 75 vol. % (A. K. Uriarte, Stud. Surf. Sci. Catal., 2000, v. 130, p. 743).

The claimed process can be carried out in the presence of antioxidant stabilizers introduced into polymers to reduce its thermal oxidate degradation.

In accordance with the present invention, oxygenation of polymers with nitrous oxide for the purpose of introducing carbonyl groups can be carried out within a wide range of conditions both in a static and a continuous flow reactor, which can be made from steel, titanium or some other suitable material.

In the case of a static variant of the process, an autoclave is loaded at room temperature with a polymer or its mixture with solvent followed by feeding nitrous oxide or its mixture with an inert gas dilution gas to the reactor. An amount of nitrous oxide is selected such that its pressure at reaction temperature is 0.1-100 atmospheres. The concentration of the inert dilution gas in mixture with $N_2O$ is selected such that it is at most 99%. The reactor is then closed and heated to a reaction temperature in the region of 50 to 350° C. The time of reaction is from several minutes to several dozen hours in relation to conditions of its realization and also requirements imposed on process indices.

Upon termination of reaction, the reactor is cooled, pressure is measured and an analysis is made of the final composition of a gaseous phase by a gas chromatography method. Judging by an amount of nitrogen formed by the reaction (1), an amount of oxygen introduced into a polymer is calculated. The amount of the introduced oxygen can also be calculated from IR-spectroscopy or NMR data on the conversion of polymer C=C bonds into carbonyl C=O groups. The molecular weight and molecular-weight distribution (MWD) of a primary polymer and oxygenated samples are determined by a method of high-temperature gel-permeation chromatography (GPC).

According to the present invention, an amount of oxygen introduced into a polymer in the form of carbonyl groups can be varied within wide limits: from 0.01% wt to the complete conversion of C=C bond into C=O groups to account for 30% wt. Oxygenation with the introduction of a small amount of oxygen does not practically affect the molecular weight and MWD of a primary (parent) polymer and can be regarded as a new method for modyfing physico-chemical characteristics thereof.

Deeper oxygenation is accompanied by cleavage of polymer molecules into fragments whose molecular weight can, depending on an amount of oxygen introduced, be diminished by a factor of at most $10^2$ in comparison with a primary (parent) polymer. This oxygenation can be considered to be a novel method for producing oxygen-containing oligomers. For example, while introducing 15.8% wt of oxygen into synthetic stereoregular (cis-)polybutadiene rubber (cf. further Example 3), its number-average molecular weight $M_n$ is diminished from 40900 to 1360, with narrow molecular-weight distribution preserved ($M_w/M_n$=2.0). The resultant product is an oligomer whose molecules contain on an average 21 monomeric units and comprise 13 C=O groups each.

A concept of invention is illustrated by the following examples.

Example I. In the Example, a low pressure polyethylene of low pressure ($M_n$=960, $M_w/M_n$=1.7) whose polymeric chain comprises 10 terminal double bonds $RCH=CH_2$ per 1000 carbon atoms is used. A stainless steel parr-reactor of 25 $cm^3$ capacity with a stirrer (firm Parr) is loaded with I g of said polyethylene and 15 $cm^3$ of toluene as solvent. The reactor is blown off with nitrous oxide, with its pressure brought to 25 atmospheres. The reactor is closed in a pressure tight manner, heated to 230° C. and maintained at this temperature for 12 hours. According to a chromatographic analysis of gaseous phase, the amount of oxygen introduced into a polymer is 0.7% w.

FIG. 1 (spectra 1 and 2) shows the IR-spectra of primary polyethylene and after the treatment thereof with nitrous oxide. The number of terminal C=C bonds in the polyethylene is determined from the intensity of absorption bands 909 and 990.6 $cm^{-1}$. The reduced intensity of 909 $cm^{-1}$ band in the oxygenated polyethylene corresponds to the conversion of 48% of C=C bonds. Simultaneously a new intensive band 1723 $cm^{-1}$ emerges in the spectrum which corresponds to the oscillations of C=O groups introduced into a polymer.

Figure 2:
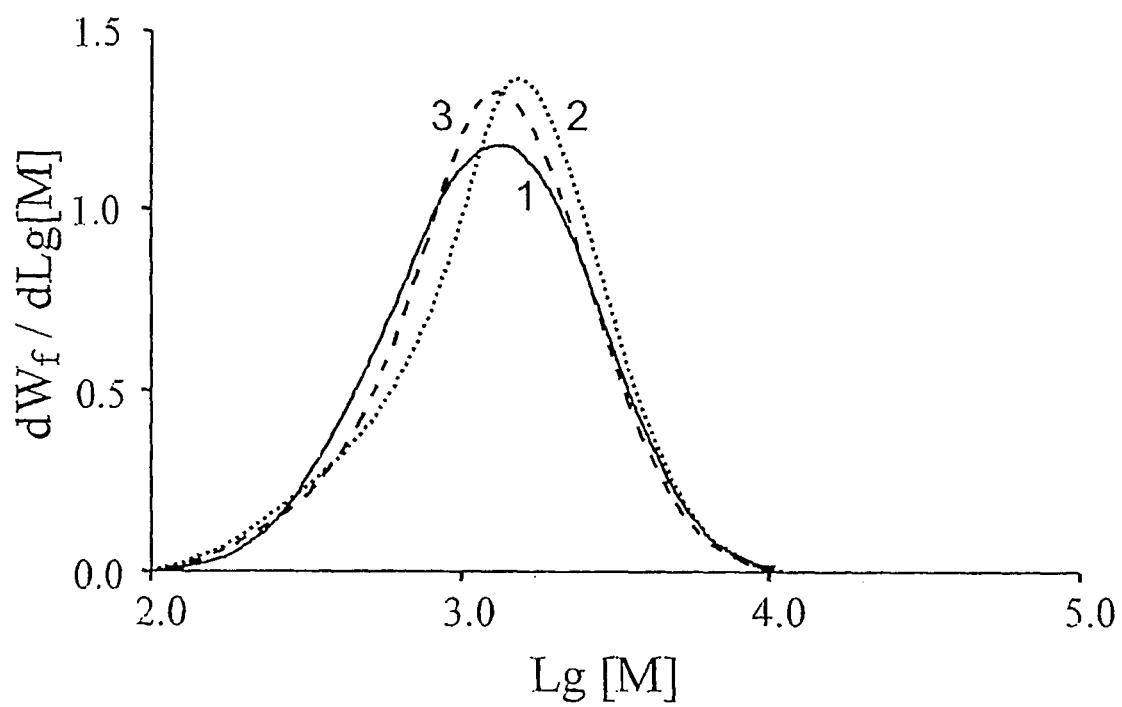
FIG. 2 shows MWD curves for the primary (parent) and oxygenated polyethylene.

FIG. 2 (curves 1 and 2) shows MWD curves for the primary (parent) and oxygenated polyethylene. The parent polyethylene has a number-average molecular weight of $M_n$=960 and narrow molecular-weight distribution ($M_w/M_n$=1.7). The introduction of carbonyl groups does not result in a substantial change in the molecular weight of polyethylene ($M_n$=1000, $M_w/M_n$=1.7).

Example 2 is similar to Example I, with the only difference that process is carried out at 250° C. FIG. 1 (spectrum 3) shows the IR-spectrum of polyethylene after the reaction with $N_2O$. Apparently band 909 $cm^{-1}$ practically disappears, which indicates to almost a complete conversion of C=C bonds and the intensity of band 1723 $cm^{-1}$ of C=O groups attains a maximum peak value. An amount of oxygen introduced into a polymer is 1.4% w.

The molecular weight distribution of the polyethylene sample obtained (FIG. 2, curve 3) does not change in essence ($M_n$=970, $M_w/M_n$=1.7).

Example 3. In the Example, use is made of a synthetic stereoregular (cis-)polybutadiene rubber comprising as stabilizer an additive of 2.6-di-tert-butyl-para-cresol issued. A stainless steel parr-reactor size of 100 $cm^3$ capacity with a stirrer (firm Part) is loaded with 5 g of said polymer and 60 $cm^3$ of toluene as solvent. The reactor is blown off with nitrous oxide to bring the latter's pressure up to 15 atmospheres. Process is conducted at 250° C. for 12 hours.

Figure 3:
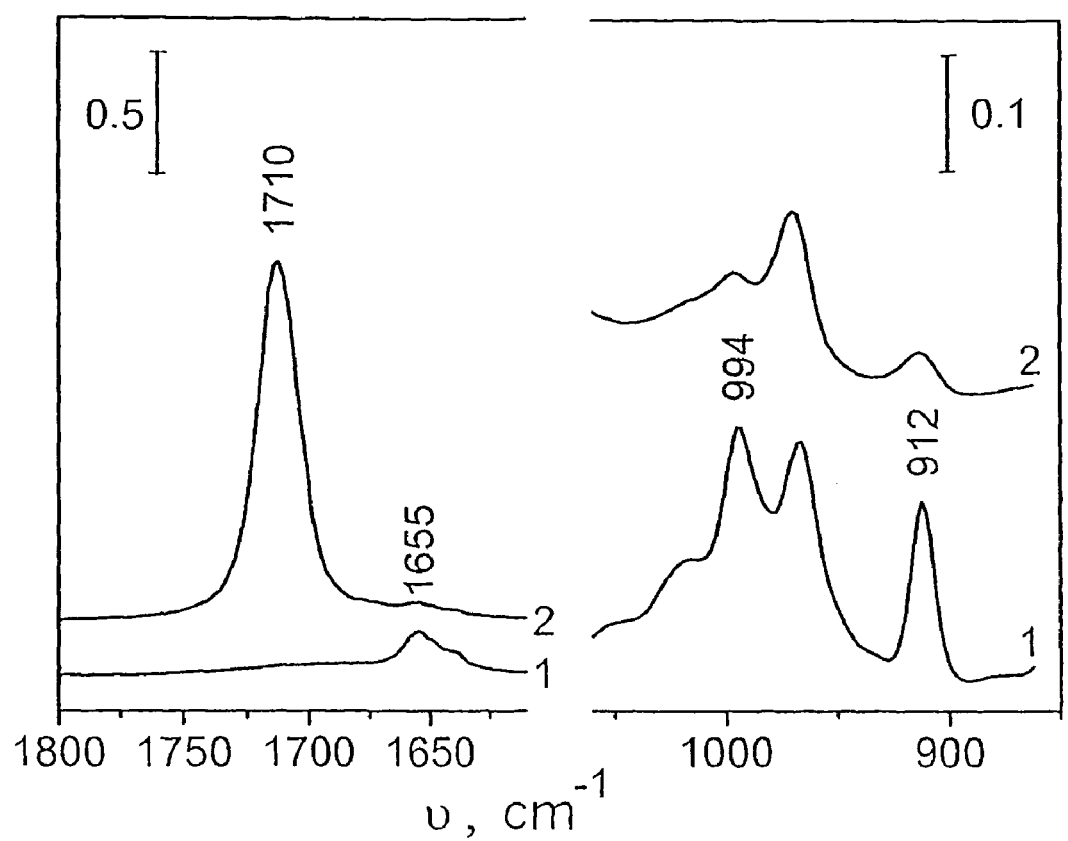
FIG. 3 shows the IR-spectra of parent rubber (spectrum I) before and after its oxygenation with nitrous oxide.

FIG. 3 shows the IR-spectra of parent rubber (spectrum I) and after its oxygenation with nitrous oxide (spectrum 2). Apparently nitrous oxide treatment leads to reducing the intensity of bands 1655, 994 and 912 $cm^{-1}$ relating to polymer C=C bonds and simultaneously to appearing a new intensive band 1710 $cm^{-1}$ which points out to the formation of carbonyl C=O groups. The quantity of oxygen introduced into the rubber is 15.8% wt.

Figure 4:
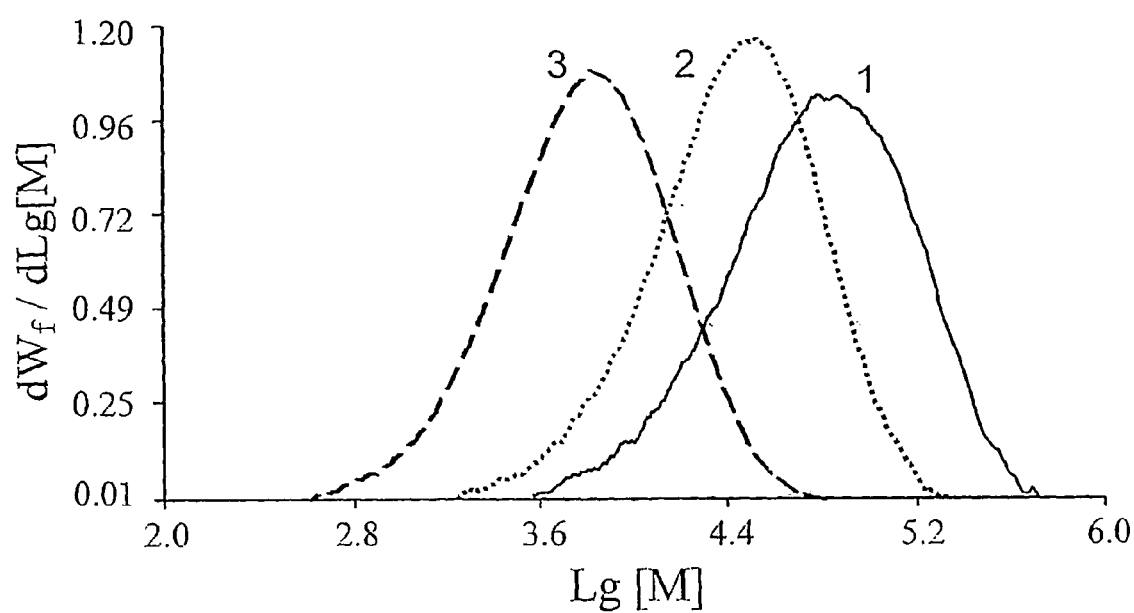
FIG. 4 shows the molecular weight distribution of the primary (parent) polymer before and after treatment.

The primary (parent) polymer has an average molecular weight of $M_n$=40900 and narrow molecular-weight distribution ($M_w/M_n$=2.2) (FIG. 4, curve I). On treatment with nitrous oxide and introduction of carbonyl groups, the molecular weight of an oxygenated polymer is reduced to $M_n$=1360, with narrow molecular-weight distribution preserved ($M_w/M_n$=2.0). The sample obtained is an oligomer whose molecules include on an average 21 monomeric units and comprise 13 carbonyl groups each.

Example 4 is similar to Example 3, with the only difference that the initial pressure of $N_2O$ is set 10 atmospheres and process is carried out at 200° C. for 5 hours. By the IR-spectroscopy results, nitrous oxide treatment is accompanied by a reduced intensity of the adsorption bands of C=C bonds in a polymer (1655, 994 and 912 $cm^{-1}$) and the appearance of a new band of carbonyl C=O groups (1716 $cm^{-1}$). An amount of oxygen introduced into the polymer is 1.4% wt.

FIG. 4 (curve 2) shows the molecular-weight distribution of the sample obtained. On nitrous oxide treatment, the molecular weight of a polymer is reduced to $M_n$=18200, with narrow molecular-weight distribution ($M_w/M_n$=1.9) preserved.

Example 5 is similar to Example 3, with the only difference that process is carried out at 230° C. An amount of oxygen introduced into a polymer is 8.8% wt.

The molecular—weight distribution of the sample obtained is given in FIG. 4 (curve 3). On nitrous oxide treatment and introduction of carbonyl groups, an oxygenated polymer has the following molecular-weight characteristics: $M_n$=2780, $M_w/M_n$=2.0. The obtained sample is an oligomer whose molecules include on an average 47 monomeric units each and comprise 15 carbonyl groups each.

Example 6 is similar to Example 4, with the only difference that use is made therein of the synthetic stereoregular (cis-)polyisoprene rubber is used and the initial pressure of nitrous oxide in the reactor is set 15 atmospheres. An amount of oxygen introduced into a polymer is 1.5% wt.

Example 7 is similar to Example 6, with the only difference that process is carried out at 230° C. for 12 hours. An amount of oxygen introduced into rubber is 9.7% wt.

Example 8 is similar to Example I, with the only difference that, as solvent, benzene is used and instead of pure nitrous oxide the reactor is supplied with a mixture of $N_2O$ (70%) with an inert dilution gas—nitrogen. The initial pressure in the vessel is set 55 atmospheres. An amount of oxygen introduced into polyethylene is 0.4% w. The molecular weight and the molecular-weight distribution of the polyethylene sample obtained do not change substantially ($M_n$=980, $M_w/M_n$=1.7) in comparison with the primary (parent) polymer.

Example 9 is similar to Example 4, with the only difference that instead of pure nitrous oxide, the reactor is supplied with a mixture of $N_2O$ (40%) with carbon dioxide as inert dilution gas and mesitylene is used as solvent. The initial pressure of the mixture in the reactor is set 45 atmospheres. An experiment is made for 2 hours. An amount of oxygen introduced into rubber is 0.3% wt. The molecular-weight characteristics of an oxygenated sample do not change substantially ($M_n$=37300, $M_w/M_n$=2.1) in comparison with the primary (parent) polymer.

The invention claimed is:

1. A method for introducing carbonyl groups into a polymer containing double carbon-carbon bonds, wherein it is carried out by oxygenation of the double carbon-carbon bonds of the polymer with nitrous oxide ($N_2O$) to form carbonyl groups with the oxygen content in the resulting polymer of 0.01 to 30 wt %.

2. The method according to claim 1 wherein oxygenation of the polymer with nitrous oxide is carried out at a temperature between 50 and 3500° C.

3. The method according to claim 1, wherein the pressure of nitrous oxide is 0.1 to 100 atmospheres.

4. The method according to claim 1, wherein a reaction mixture is added with an inert dilution gas.

5. The method according to claim 4, wherein the concentration of the inert gas is selected such that the possibility of forming dangerously explosive compositions is precluded.

6. The method according to claim 1, wherein oxygenation of the polymer is carried out in the presence of solvent.

* * * * *